United States Patent [19]

Fukami

[11] 3,919,480

[45] Nov. 11, 1975

[54] DECODING APPARATUS FOR REPRODUCING FOUR SEPARATE INFORMATION SIGNALS

[75] Inventor: Takeshi Fukami, Tokyo, Japan

[73] Assignee: Sony Corporation, Tokyo, Japan

[22] Filed: Nov. 22, 1974

[21] Appl. No.: 526,333

[30] Foreign Application Priority Data

Nov. 29, 1973 Japan .............................. 48-134198

[52] U.S. Cl. ...................... 179/1 GQ; 179/100.4 ST

[51] Int. Cl.[2] ............................................ H04N 5/00

[58] Field of Search ............ 179/1GQ, 1G, 15BT, 179/100.4 ST, 100.1 TD

[56] References Cited

UNITED STATES PATENTS

| | | | |
|---|---|---|---|
| 3,725,586 | 4/1973 | Iida | 179/1 G |
| 3,806,667 | 4/1974 | Ishigaki et al. | 179/1 GQ |
| 3,821,471 | 4/1974 | Bauer | 179/1 GQ |

*Primary Examiner*—William C. Cooper
*Assistant Examiner*—Tommy P. Chin
*Attorney, Agent, or Firm*—Lewis H. Eslinger; Alvin Sinderbrand

[57] ABSTRACT

An apparatus for decoding four separate channels of information transduced from a medium having two separate tracks and for presenting the same on four loudspeakers to give a listener the illusion of sound coming from a corresponding number of separate sources. The realism is enhanced by a decoding system which accepts two output signals from the medium, separates them into four independent channels each carrying predominantly the information contained in a respective one of the original signals and, utilizing a logic system, derives control signals for controlling the delay time of delay circuits associated with the four separate channels. The use of the delay circuits improves the separation of the four channels, thereby to enhance the realism of four channel simulation.

4 Claims, 11 Drawing Figures

DECODING APPARATUS FOR REPRODUCING FOUR SEPARATE INFORMATION SIGNALS

BACKGROUND OF THE INVENTION

1. Field of the Invention

This invention relates generally to a decoding apparatus for reproducing four separate information signals, and more particularly to a novel control system to enhance the realism of four channel simulation.

2. Description of the Prior Art

The so-called SQ system and a regular matrix system referred to as the RM system have been used as four channel stereo systems of sound reproduction.

In general, the decoder of the SQ system includes four phase shifters, operational circuits connected to output circuits of the phase shifters, and a phase inverter. Four demodulated signals conventionally identified as $L_F'$, $L_B'$, $R_B'$, and $R_F'$ signals are obtained from two composite signals $L_T$ and $R_T$ applied to the two input circuits of an SQ system.

The decoder of the RM system also generally includes four phase shifters and operational circuits connected to output terminals of the phase shifters, but no phase inverter is provided. However, four demodulated signals $L_F'$, $L_B'$, $R_B'$, and $R_F'$ are still obtained from the two composite signals $L_T$ and $R_T$, respectively.

In the case of the SQ system, the cross-talk components $L_B$ and $R_B$ are mixed into the demodulated signal $L_F'$, which corresponds to the left front, as well as into the demodulated signal $R_F'$, which corresponds to the right front. Cross-talk components $L_F$ and $R_F$ are mixed into the demodulated signal $L_B'$, which corresponds to the left back, as well as into the demodulated signal $R_B'$, which corresponds to the right back. Therefore, with the SQ system, the difference between the magnitude of the dominant, or main, component $L_F$ of the signal $L_F'$and that of the dominant, or main, component $R_F$ of the signal $R_F'$is detected, and the difference between the magnitude of the dominant, or main, component $L_B$ of the signal $L_B'$and that of the dominant, or main component $R_B$ of the signal $R_B'$is detected. When the former difference is greater than the latter difference, the signals $L_F'$ and $R_F'$ are dominant as compared with those $L_B'$ and $R_B'$. Therefore, in such a case, the levels of the signals $L_F'$ and $R_F'$ are increased correspondingly. On the other hand, when the difference between the signals $L_B$ and $R_B$ is greater than the difference between the signals $L_F$ and $R_F$, the signals $L_B'$ and $R_B'$ are dominant as compared with those $L_F'$ and $R_F'$. Therefore, in such a case, the level of the signals $L_B'$ and $R_B'$ are increased correspondingly. Thus, the signal separation can be much improved.

In the case of the RM system, the cross-talk components $L_B$ and $R_F$ are mixed into the demodulated signal $L_F'$, which corresponds to the left front, as well as into the demodulated signal $R_B'$, which corresponds to the right back. Cross-talk components $L_F$ and $R_B$ are mixed into the demodulated signal $R_F'$, which corresponds to the right front as well as into the demodulated signal $L_B'$, which corresponds to the left back. Accordingly, with the RM system, the difference between the magnitude of the dominant, or main, component $L_F$ of the signal $L_F'$ and that of the dominant, or main, component $R_B$ of the signal $R_B'$ is detected, and the difference between the magnitude of the dominant, or main, component $R_F$ of the signal $R_F'$ and that of the dominant, or main, component $L_B$ of the signal $L_B'$ is detected. When the difference between the components $L_F$ and $R_B$ is greater than the difference between the components $R_F$ and $L_B$, the signals $L_F'$ and $R_B'$ are dominant as compared with the signals $R_F'$ and $L_B'$. Therefore, in such a case, the level of the signals $L_F'$ and $R_B'$ are increased correspondingly.

When the difference between the components $R_F$ and $L_B$ is greater than the difference between the components $L_F$ and $R_B$, the signals $R_F'$ are dominant as compared with the signals $L_F'$ and $R_B'$. Therefore, in such a case, the level of the signals $R_F'$ and $L_B'$ are increased correspondingly. Thus, the signal separation can be much improved.

However, with such a control in level, in the logic operation that the dominant signal is detected, the control signal is produced in response to the detected output and the signal controlling part is operated by the contol signal, some extent of time delay occurs from the supply of the input signal to the start of the control for the input signal, and hence it is almost impossible to control the first wave of the input signal. Further, the logic operation cannot be followed up by a certain signal and a sound image is shifted or fluctuated.

In general, with regard to two sounds which may be produced with a time difference, there has been reported, as a result of psychological experiments, that a sound image seems to be located at the source of the first of these sounds. According to one of the published acoustic psychological experiments, in the case of sounds of the same amplitude produced from two sound sources spaced apart at a certain distance, if a time difference of about 0.3m sec. exists between the two sounds, they seem to come from a source nearer the first sound. If the time difference becomes 1 m sec., it seems that a sound is apparently produced only from the source that produces the first sound. If this is compared with the directional localization in a level difference, the time difference of 0.3 m sec. corresponds to a level difference of about 8dB.

SUMMARY OF THE INVENTION

It is an object of the present invention to provide decoding apparatus for reproducing four separate information signals free from the drawbacks of the prior art.

It is another object of the invention to provide decoding apparatus for reproducing four separate information signals in which a delay means is provided for each channel, and the delay means are controlled by a control signal from a logic control circuit, so that the separation of signals is improved without changing the signal level in the channel.

It is a further object of the invention to provide decoding apparatus for reproducing four separate information signals in which a delay means and gain control means are provided in each channel to improve the localization and separation of a reproduced sound image.

It is still a further object of the invention to provide decoding apparatus which can be used for reproducing four separate information signals and which can be made at low cost by improving a part of the prior art decoder with a logic.

According to the present invention decoding apparatus is provided for reproducing four separate information signals which apparatus comprises a decoder for receiving first and second composite signals, each of which includes at least three of the four audio information signals in preselected amplitude and phase relationship. The apparatus includes means for producing first, second, third, and fourth output signals, respectively, each containing a different one of the audio information signals as a predominant signal and a different pair of the audio information signals as subdominant signals. It also includes first, second, third, and fourth transmitting channels for transmitting the first, second, third, and fourth output signals, respectively, and a circuit for producing at least one control signal by comparing the magnitudes of the predominant signals in at least two of said transmitting channels. Variable delay circuits are connected to the respective transmitting channels, respectively, and are controlled by the control signal to delay the output signal.

Other objects, features and advantages of the present invention will become apparent from the following description taken in conjunction with the accompanying drawings.

DESCRIPTION OF THE PREFERRED EMBODIMENTS

Figures 1, 3:
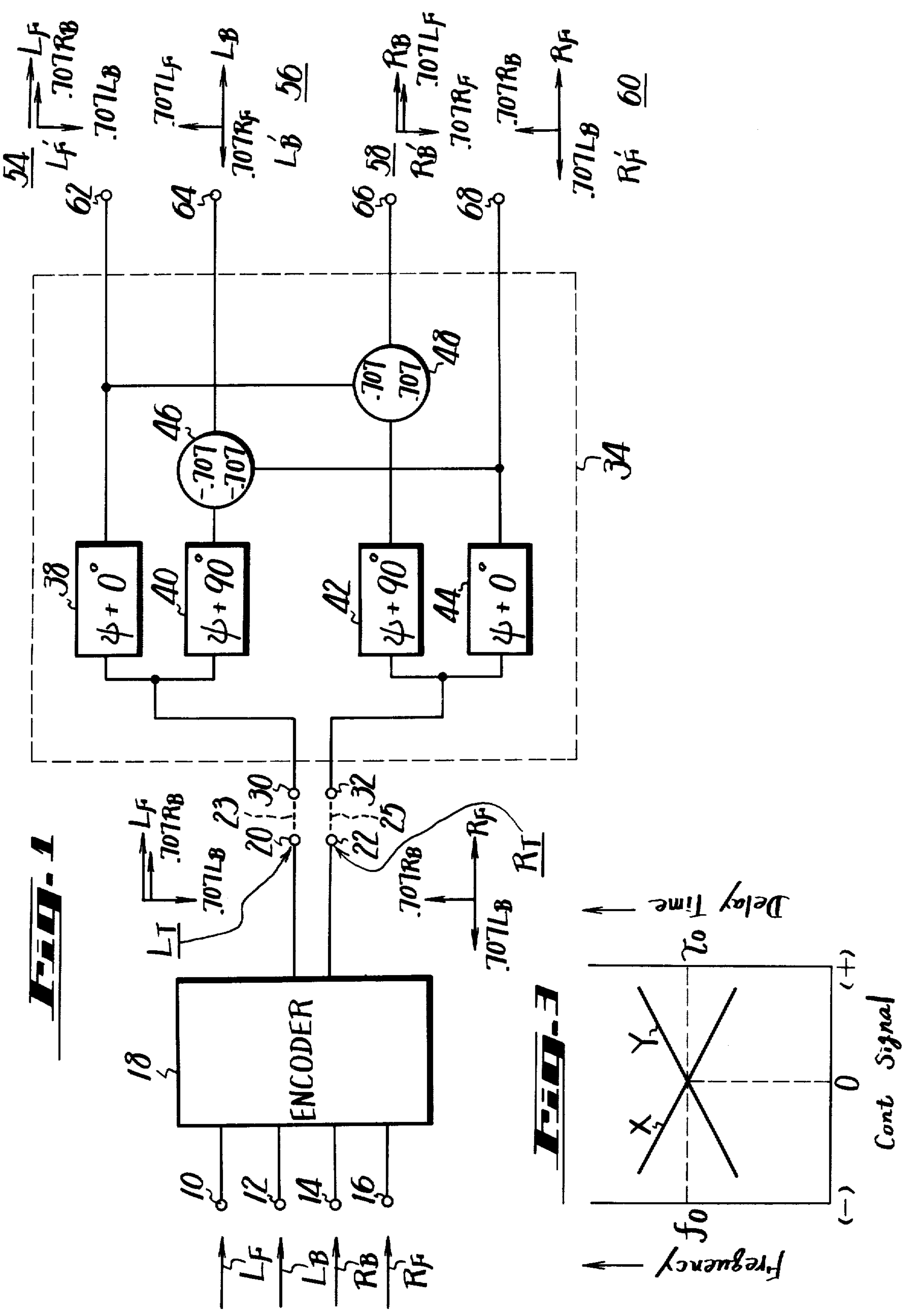
FIG. 1 is a block diagram of the decoding section of the SQ system used for explaining the decoding apparatus for reproducing four separate information signals according to the present invention.
FIG. 3 is a graph showing the characteristic of the variable delay means used in the embodiment depicted in FIG. 2.

FIG. 1 is a block diagram of a quadraphonic sound system with which the present invention is to be used. An encoder 18 receives left front ($L_F$), left back ($L_B$), right back ($R_B$) and right front ($R_F$) signals at its input terminals 10, 12, 14 and 16, respectively. The encoder 18 transforms these input signals into two composite output signals designated $L_T$ and $R_T$ at its output terminals 20 and 22, respectively. The phasor components of these signals are represented by the phasor diagrams adjacent the respective terminals. These composite signals may be characterized in complex notation as follows:

$$L_T = L_F + 0.707R_B - j(0.707L_B) \quad R_T = R_F - 0.707L_B + j(0.707R_B)$$

The encoded composite signals may thereafter be applied to any suitable two-channel medium as represented by channels 23 and 25, which may be, for example, the two surfaces of the V-shaped groove in a stereophonic record, a two-channel magnetic tape, or an FM multiplex radio channel.

Upon playback or recovery from the two-channel medium, the composite signals $L_T$ and $R_T$ are applied to two input terminals 30 and 32, respectively, of a decoder 34. The composite signals are then phase shifted by pairs of networks 38 and 40 and 42 and 44 to arrange the phasor components of the composite signals relative to each other in a manner that favors selective addition and subtraction so as to derive four output signals, each containing a predominant component corresponding to one of the original input signals. The basic phase shift angle, $\Psi$, which is introduced by the networks is a function of frequency.

Thus the network 38 shifts the composite signal $L_T$ by the basic phase shift angle $\Psi$, the netword 40 shifts the composite signal $L_T$ by a phase angle of $\Psi + 90°$, the network 42 shifts the composite signal $R_T$ by a phase angle of $\Psi + 90°$and the network 44 shifts the composite signal $R_T$ by the basic phase angle $\Psi$. The output from the phase shifter 38 is applied to an output terminal 62 and the output from the phase shifter 44 is applied to an output terminal 68. The output signal of the phase shifter 38 attenuated to 0.707 of its full amplitude, is added to a correspondingly attenuated output signal from the phase shifter 42 in a summing circuit 48, and the resultant signal therefrom is applied to an output terminal 66 of the decoder 34. Equal negative, or inverted, portions of the output signals of the phase shifters 40 and 44 attenuated to the same amount to correspond to −0.707 of the output signals of the phase shifters 40 and 44 are combined in a summing junction 46 and the resultant signal therefrom is applied to the output terminal 64 of the decoder 34.

The first, second, third, and fourth output signals appearing at the output terminals 62, 64, 66 and 68 of the decoder 34 predominantly contain the original signals $L_F$, $L_B$, $R_B$ and $R_F$, respectively, combined with various 0.707 magnitude (−3dB) components of the other signals, as depicted by the phasor groups 54, 56, 58, and 60, respectively. These phasor groups have been designated $L_F'$, $L_B'$, $R_B'$, and $R_F'$, respectively.

Figure 2:
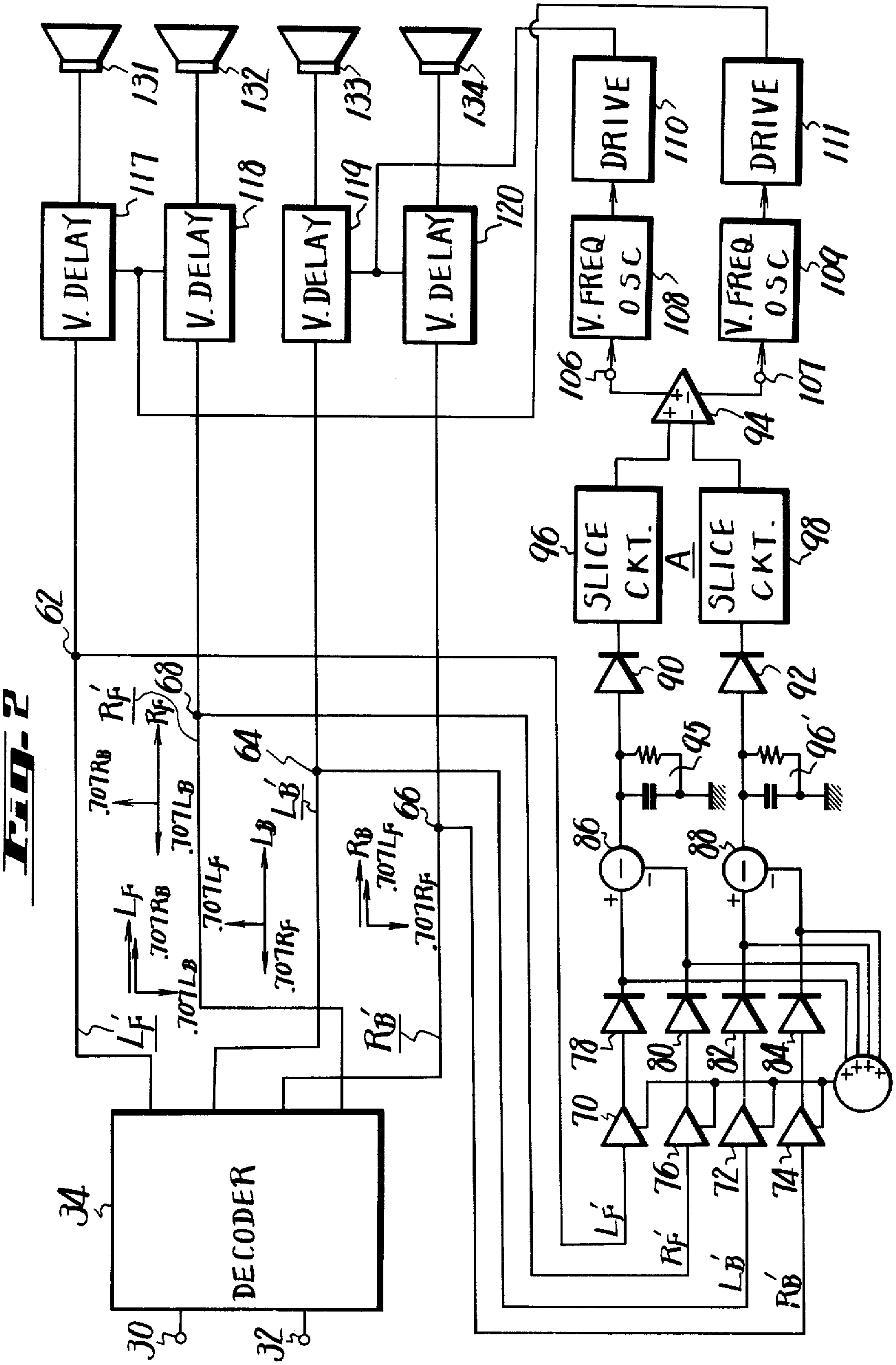
FIG. 2 is a block diagram of an embodiment of the decoding apparatus for reproducing four separate information signals according to the present invention.

Referring now more particularly to FIG. 2 the audible reproduction of these signals by a circuit according to the invention will now be described.

The signals appearing at the output terminals 62, 68, 64, and 66 are applied to the input terminals of gain controlled amplifiers 70, 76, 72, and 74, respectively. The output signals from the gain controlled amplifiers 70, 76, 72, and 74 are applied to full wave rectifying circuits 78, 80, 82, and 84, respectively. The purpose of the full wave rectifying circuits is to eliminate negative voltages so that a signal with a 180° phase difference is the equivalent of a 0° phase difference for symmetrical signals.

The output from the full wave rectifier 80 is subtracted from the output of the full wave rectifier 78 in a subtracting circuit 86. The difference signal output of the circuit 86 is applied to a full wave rectifier 90 through a time constant circuit 95, shown in FIG. 2 as a parallel-connected RC circuit across the input terminals of the rectified 90. The output from the full wave rectifier 90 is applied to a clipping, or slice, circuit 96. The output from the slice circuit 96 is applied to the positive input terminal of a differential amplifier 94. The output from the full wave rectifier 84 is subtracted from the output of the full wave rectifier 82 in another subtracting circuit 88. The difference signal output from the circuit 88 is applied to a full wave rectifier 92 through a time constant circuit 96. The full wave rectified output from the rectifier 92 is applied through a slice circuit 98 to the negative input terminal of the amplifier 94.

The output signals from the full wave rectifiers 78, 80, 82, and 84 are combined in a summing circuit 99 and the output signal therefrom is used to control the gain of the variable gain amplifiers 70, 76, 72, and 74. The gain controlled amplifiers 70, 72, 74, and 76 are chosen to have identical or closely similar gain versus control characteristics. The circuit section from the input terminals of the amplifiers 70–76 to the output terminals of the amplifier 94 constitute a wave matching logic circuit A.

In this case, at one output terminal 106 of the logic circuit A, there is obtained a first control signal expressed as $||L_F|-|R_F|| - ||L_B|-|R_B||$ with respect to the dominant components $L_F$, $L_B$, $R_F$, and $R_B$ of the demodulated signals or phase groups $L_F'$, $L_B'$, $R_F'$, and $R_B'$, while at the other output terminal 107 of the logic circuit A there is obtained a second control signal expressed as $||L_B|-|R_B|| - ||L_F|-|R_F||$. If the components $||L_B|-|R_B||$ and $||L_F|-|R_F||$ are equal, both the first and second control signals are zero and the phasor groups $L_F'$ and $R_F'$ are dominant. If the condition $||L_F|-|R_F|| > ||L_B|-|R_B||$ is satisfied, the first control signal is positive, the second control signal is negative and the phasor groups $L_B'$ and $R_B'$ are dominant. On the other hand, if the condition $||L_F|-|R_F|| < ||L_B|-|R_B||$ is satisfied, the first control signal becomes negative, but the second control signal becomes positive.

These first and second control signals are applied to variable frequency voltage-controlled oscillators 108 and 109 as control voltages, respectively. The output signals from the variable frequency oscillators 108 and 109 are applied to driving circuits 110 and 111, respectively, which produce clock pulses. The clock pulses from the driving circuits 110 and 111 are applied to variable delay means 117 to 120, respectively, which in turn are connected to the output terminals 62, 68, 64, and 66, respectively.

Charge transfer devices or digital delay means may be used as the variable delay means 117 to 120, by way of example. In this example, the charge transfer devices are employed. As is generally known, the delay time $\tau$ of a charge transfer device is expressed as follows:

$$\tau = m/f$$

where $m$ represents the bit number of the charge transfer device and $f$ the frequency of a clock pulse applied to the charge transfer device.

FIG. 3 is a graph showing the characteristics of the control signal versus the oscillation frequency of the variable frequency oscillators 108 and 109. As shown by a line X, the oscillation frequency decreases as the control signal increases in magnitude, and when the control signal is zero, the oscillation frequency becomes $f_o$. The delay time of the variable delay means 117 to 120 formed of the charge transfer devices are in reverse proportion to the frequency of clock pulses applied thereto or the oscillation frequency of the variable frequency oscillators 108 and 109, so that their characteristics are in proportion to the control signal, as shown by the line Y in FIG. 3. When the control signal is zero, the delay time is $\tau_o$.

In the embodiment of the invention described as above, when the demodulated signals $L_F'$ and $R_F'$ are dominant ones, the first control signal appeared at the output terminal 106 of the logic circuit A is positive, while the second control signal appeared at the output terminal 107 of the logic circuit A is negative. As a result, the oscillation frequency of the variable frequency oscillator 108 becomes lower than $f_o$, while the oscillation frequency of the variable frequency oscillator 109 becomes higher than $f_o$. Accordingly, the delay time of the variable delay means 117 and 118 becomes shorter than $\tau_o$, while that of the variable delay means 119 and 120 becomes longer than $\tau_o$.

Figures 4A, 4B, 4C:
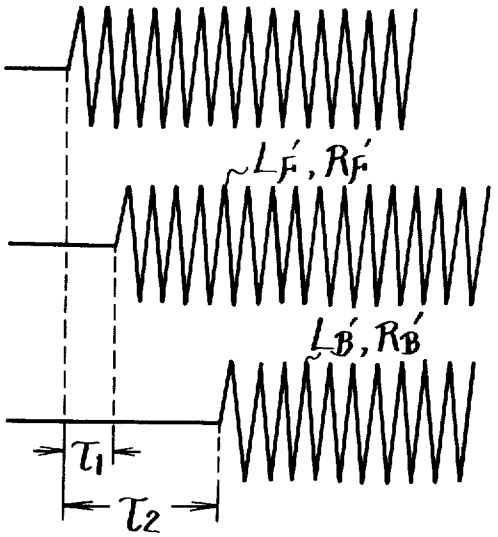
FIGS. 4A to 4C are graphs representing signals used for explaining the operation of the decoding apparatus shown in FIG. 2.

If, under such circumstances, the decoder 34 produces a demodulated signal as shown in FIG. 4A, the demodulated signals $L_F'$ and $R_F'$, as dominant ones, pass through the variable delay means 117 and 118. Thus, the demodulated signals $L_F'$ and $R_F'$ are supplied to the speakers 131 and 132, respectively, with a delay time of $\tau_1$ ($\tau_1<\tau_0$) after the production of the demodulated signals, as shown in FIG. 4B. The other demodulated signals $L_B'$ and $R_B'$ pass through the variable delay means 119 and 120 and are supplied to the speakers 133 and 134, respectively, with a delay time $\tau_2$ ($\tau_2>\tau_0$) after their production, as shown in FIG. 4C. By making the dominant demodulated signals $L_F'$ and $R_F'$ ahead of the other demodulated signals $L_B'$ and $R_B'$ by the time ($\tau_2 - \tau_1$), the dominant signals can be clearly localized from the acoustic point of view. Further, when the demodulated signals $L_B'$ and $R_B'$ are the dominant ones, the dominant demodulated signals $L_B'$ and $R_B'$ are ahead of the other demodulated signals $L_F'$ and $R_F'$.

According to the invention constructed as above, two dominant signals are produced ahead of the residual two signals, so that the localization of the four channel signals and their separation can be improved. Since the variable delay means with the predetermined delay time are provided in accordance with this invention, a delay time, which is necessary until the dominant signal is detected and then the control signal is produced, can be cancelled. Thus, as compared with a system in which the control is achieved in accordance with the level, the present invention has the advantage that the control can be achieved from the first wave and there is no fear that the logic operation cannot be followed up in accordance with a signal or that the sound image is moved or fluctuated.

With the above embodiment of this invention as just described, the delay times of the dominant signal and the other signals are both controlled by the control signal, but it may be possible that either one or both of the delay times may be controlled, or a delay means with both a fixed delay time and a variable delay means may be used.

The above effect attained by the invention is remarkable when the transient level change is large as in the case of a sound produced instantaneously, but is not so effective for a sound produced continuously. Therefore, it may be possible for the first and second control signals from the logic circuit to be applied to the variable frequency oscillator through a time constant circuit such as a differentiating circuit or the like to provide a time difference between the dominant signal and the residual signal only during a transient process.

Figure 5:
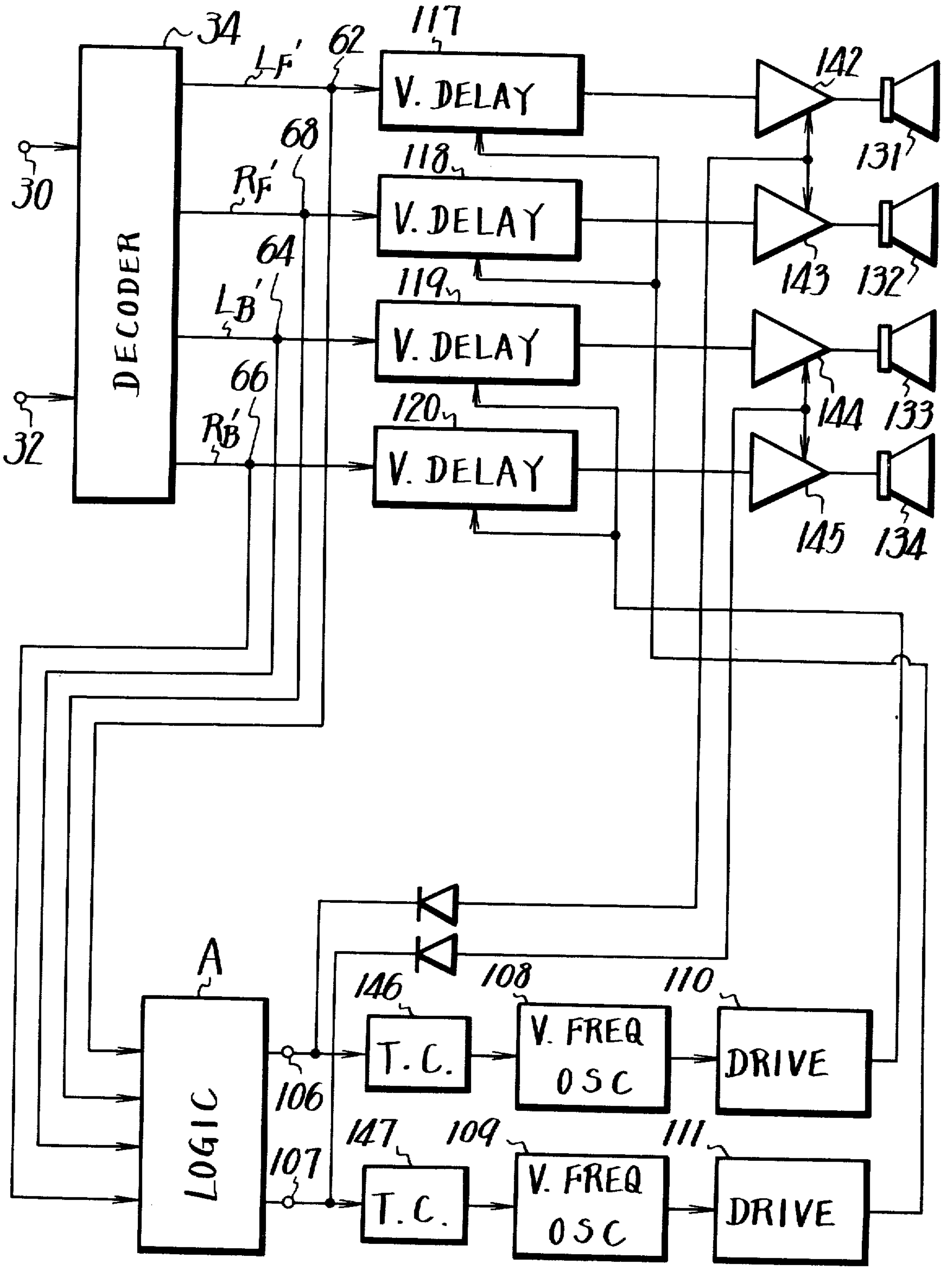
FIG. 5 is a block diagram showing another embodiment of the decoding apparatus for reproducing four separate information signals of the present invention.

FIG. 5 shows another embodiment of the invention which has taken the above into account and in which the parts common to those of FIG. 2 are marked with the same reference numerals. In the embodiment of FIG. 5, variable gain control amplifiers 142, 143, 144, and 145 are provided following the varable delay means 117, 118, 119, and 120, respectively. These variable gain amplifiers 142 to 145 are controlled only by the first and second control signals obtained at the output terminals 106 and 107 of the logic circuit A, for example, with their negative components, and their gain is decreased as the negative components of the first and second control signals are increased. Time constant circuits 146 and 147 are connected between the output terminals 106, 107 and the variable frequency oscillators 108, 109, respectively, so that only when the level is subjected to a relatively large transient change does the dominant signal proceed to the residual signal.

Figures 6A, 6B, 6C, 6D:
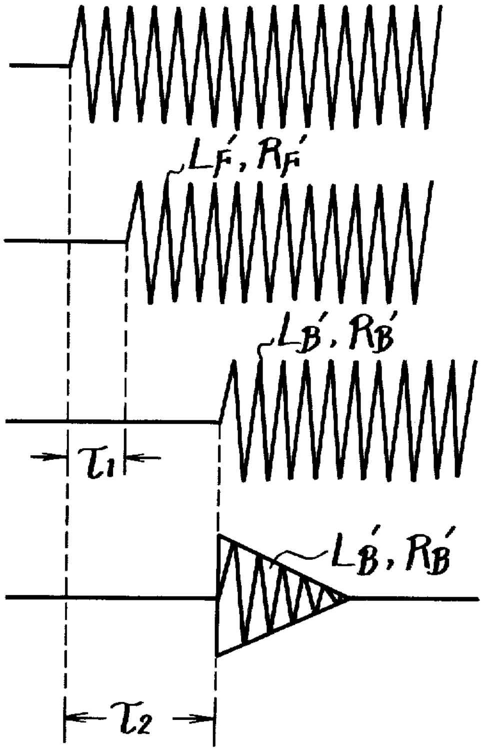
FIGS. 6A to 6D are graphs of signals used for explaining the operation of the embodiment shown in FIG. 5.

In the embodiment of FIG. 5, when the demodulated signals $L_F'$ and $R_F'$ are dominant signals, the first control signal obtained at the output terminal 106 becomes positive and the second control signal obtained at the output terminal 107 becomes negative, as described previously. Therefore, the delay time of the variable delay means 117 and 118 is decreased but that of the variable delay means 119 and 120 is increased. Further, the variable gain amplifiers 144 and 145 are controlled by the negative second control signal obtained at the output terminal 107 so that their gain is decreased. As a result, the dominant signals $L_F'$ and $R_F'$ are produced with the delay time $\tau_1$ ($\tau_1 < \tau_0$) from the production of the demodulated signal, as shown in FIGS. 6A and 6B, and the other demodulated signals $L_B'$ and $R_B'$ are produced with the delay time $\tau_2$ ($\tau_2 > \tau_0$) from the production of the demodulated signal, as shown in FIG. 6C. The levels of the demodulated signals $L_B'$ and $R_B'$ are decreased by the variable gain amplifiers 144 and 145, as shown in FIG. 6D. Thus, the localization, separation and so on of the four-channel signals, including the steady state, can be improved.

The above embodiments show the present invention as applied to decoding apparatus for the SQ system, but it will be obvious that the present invention can be applied to the RM system with the same effect.

It will be apparent that many modifications and variations could be effected by one skilled in the art without departing from the spirits or scope of the novel concepts of the present invention.

What is claimed is:

1. A decoding apparatus for reproducing four separate information signals comprising:

A. a decoder for receiving first and second composite signals each of which includes at least three of the four information signals in preselected amplitude and phase relationships and for producing first, second, third and fourth output signals, respectively, containing a different one of said information signals as a predominant signal and a different pair of said audio information signals as subdominant signals;

B. first, second, third, and fourth transmitting channels for transmitting said first, second, third and fourth output signals, respectively;

C. a control signal producing circuit for producing at least one control signal by comparing the magnitudes of said predominant signals in at least two of said transmitting channels; and D. variable delay circuits connected to said transmitting channels, respectively, to transmit respective ones of the output signals and connected to said control signal producing circuit to be controlled by the signal therefrom to delay said output signals selectively.

2. A decoding apparatus for reproducing four separate information signals according to claim 1, comprising a variable frequency oscillator connected to said control signal producing circuit to be controlled thereby and connected to said variable delay circuit, said variable delay circuit comprising an element that has delay time determined in reverse proportion to the frequency of said variable frequency oscillator.

3. A decoding apparatus for reproducing four separate information signals according to claim 2, in which said control signal producing circuit comprises:

A. a rectifying circuit for rectifying said first, second, third and fourth output signals;

B. a first subtracting circuit for subtracting said second rectified signal from said first rectified signal to produce a first difference signal;

C. a second subtracting circuit for subtracting said fourth rectified signal from said first rectified signal to produce a second difference signal; and D. a comparing circuit for comparing the magnitudes of said first and second difference signals for producing first and second control signals with opposite polarities.

4. A decoding apparatus for reproducing four separate information signals according to claim 1, in which gain control amplifiers are connected to said first, second, third and fourth transmitting channels, respectively, the gain of said variable gain amplifiers being controlled by said control signal.

* * * * *